United States Patent Office 3,364,164
Patented Jan. 16, 1968

3,364,164
AQUEOUS DISPERSION OF HYDROCARBON-ALKYL ACRYLATE COPOLYMER CONTAINING HYDROPHILIC SUBSTITUENTS, AND A DISPERSING AGENT
Harold D. Lyons, Overland Park, Kans., assignor to Gulf Oil Corporation, Pittsburgh, Pa., a corporation of Pennsylvania
No Drawing. Filed Oct. 6, 1964, Ser. No. 402,002
7 Claims. (Cl. 260—29.6)

This invention relates to aqueous dispersions of polymers and more particularly to carboxy-substituted polymers of limited hydrophilic character derived from copolymers of ethylene.

It is known that although a hydrocarbon polymer such as polyethylene is definitely lipophilic in character, that placing certain polar substituent groups on the hydrocarbon polymer chain can effect a complete reversal of character from lipophilic to hydrophilic. For example, polyvinyl alcohol and polyacrylic acid, which may be considered respectively hydroxy- and carboxy-substituted polyethylene, are so strongly solvated by water that they readily form aqueous solutions.

The water-soluble polymers mentioned above have hydrocarbon chain structures in which 50 percent of the carbon atoms in the chain have strongly hydrophilic groups attached thereto. Other polymers have been synthesized in which smaller percentages of the carbon atoms in the chain are substituted, and in which the hydrophilic properties are not so pronounced. A particularly useful class of polymers of limited hydrophilic properties may have hydrophilic substituents on from about 2.5 percent to about 25 percent of the carbon atoms in the chain. Typical substituents are of the type exemplified by carbalkoxy, carboxy, and carbamyl groups. By a judicious proportioning of the hydrophilic substituents, polymers are made which are sufficiently solvated by water so that they are readily dispersed therein, but have a tendency to form gels. The dispersions of these polymers may then be used to coat or impregnate articles, the polymer being subsequently agglomerated and dried by heating. Strangely enough, once the agglomerated particles form a coating, they are not readily redispersible in water. In fact, the more interesting polymers do not appear to be readily wet by either oil or water—a particularly valuable property in adhesives and coatings.

Unfortunately, the class of polymers described above, which readily form waterproof coatings from aqueous dispersions, have certain deficiencies. The primary deficiency is a tendency of the aqueous dispersions to form gels. The gelling behavior is in some instances unpredictable. An apparently stable aqueous dispersion may begin to gel for no apparent reason after having been stable in storage for weeks or months. Once the gelling starts, it continues to completion. The addition of acidic substances to aqueous dispersions of the polymers described above invariably causes rapid gelation. This is at least partially due to insolubility of the acid form of this class of polymers. The aqueous dispersions are generally also unstable to heating and to freezing. The tendency to gel has previously limited the usefulness of this class of polymer dispersions, despite the many desirable properties of the polymers themselves.

According to the present invention, aqueous dispersions are made of a composition consisting essentially of a substantially uniform copolymer having a hydrocarbon chain structure, from about 2.5 to about 25 percent, and preferably about 4 to 7 percent, of the carbon atoms in said chain having attached thereto substituents selected from the group consisting of carbalkoxy, carboxy, carboxylate salt, carbamyl and N-substituted carbamyl, between about 15 and 100 percent of said substituents being in carboxylate salt form and approximately one-fourth of a molar equivalent quantity, based on the total number of said substituents, of a product of condensation of a primary alkylamine with from about 5 to 50 moles, preferably about 10 to 20 moles, of ethylene oxide, said condensation product having an average molecular weight within the range of about 420 to about 2500. These dispersions have excellent resistance to gelation under the influence of acidic reagents, prolonged storage and alternate freezing and thawing and may be included in adhesive and coating formulations with a great variety of other ingredients without loss of stability.

So that the invention may be better understood, the following discussion is presented, including specific examples for purposes of illustration.

*The dispersed polymers*

A polymer possessing a hydrocarbon backbone having attached thereto a limited number of hydrophilic substituents may be made in a variety of ways. A uniform copolymer of an olefin with an unsaturated nitrile, ester or acid may be synthesized and subsequently hydrolyzed or reacted with other suitable reagents to produce the desired balance of hydrophilic and lipophilic properties.

It is particularly convenient to begin the manufacture of the dispersed polymer by making a uniform copolymer of ethylene with a readily polymerizable monomer such as methyl acrylate. Following is a representative procedure for carrying out the polymerization.

An agitated, high pressure autoclave reactor is pressured with ethylene and is brought to operating temperature of about 360° F. (218° C.) at about 20,200 p.s.i. The longitudinal agitator is rotated at about 1250 r.p.m. The polymerization reaction is started by beginning the continuous feeding of reactants at a ratio of 3.3 parts of methyl acrylate to 96.7 parts of ethylene by weight at a feed rate of about 500 lb. per hour per cubic foot of reactor volume. Lauroyl peroxide is simultaneously injected into the reactor as free radical initiator in a benzene-mineral oil vehicle at a rate of 350 p.p.m. by weight on the basis of the rate of reactant feed. As polymerization occurs, reactor temperature is controlled within the range of 300° F. to about 430° F. (185° C. to about 258° C.).

The unreacted monomers, along with the copolymer product, are discharged from the reactor. The rate of conversion to copolymer, based on total weight of reactants, is about 15 to 20 percent. Nearly all of the unreacted material is ethylene, which is recovered and circulated for re-use. The copolymer is extruded into a water bath where it is cooled and solidified, then is chopped into cubes or pellets for convenience in handling.

The copolymer made by the above procedure contains 0.109 mole of methyl acrylate per mole of ethylene as determined by infrared absorption analysis, a melt index of 1.81, a specific gravity of 0.9477 and a Vicat softening point of 47° C. The polymer shows a film impact value of 3100 p.s.i.

The ethylene-acrylate ester copolymers so obtained are highly uniform in composition and have the polymerized ethylene groups and the polymerized acrylate ester groups randomly distributed throughout the copolymer chains. "Highly uniform" as used above means that when the copolymer is separated into ten percent weight fractions by a column elution technique (as described in J. Polymer Science 31, 453, (1958)) it will contain no ten percent weight fraction which differs in polymerized acrylate ester monomer content by more than about 40 percent from the polymerized acrylate ester content of the whole copolymer. By way of specific example, when the copolymer contains 90 percent polymerized ethylene and 10 percent polymerized acrylate ester, each ten percent weight fraction of the copolymer will contain from 6 to 14 percent of polymerized acrylate ester. In most cases, the polymerized acrylate ester content of the ten percent weight fractions of the copolymer will differ from the polymerized acrylate ester content of the whole copolymer by less than 20 percent and in many by less than 10 percent.

Uniform copolymers made by a procedure of the type illustrated above may then be converted to an aqueous dispersion by alkaline hydrolysis, with or without concomitant amination. A typical procedure appears below.

Approximately 150 parts by weight of a uniform copolymer of ethylene with methyl acrylate containing 24.8 percent methyl acrylate as determined by infrared analysis, 6 parts of sodium hydroxide pellets and about 1800 parts by weight of 28 percent aqueous ammonia are charged to a stirred reactor. The mixture is heated to about 200° C. for sixteen hours, with vigorous agitation. On cooling, the reaction product is removed and filtered through wool felt. The filtered product is a white, translucent liquid with a total polymer solids content of about 9.3 percent by weight.

To the unaided eye, the appearance of the polymer dispersions made by the above procedure is that of emulsions. However, the viscosity and gelation behavior indicate that the compositions are molecularly dispersed polyelectrolytes which are rather poorly solvated. The milky appearance of the dispersions is an effect which its attributable more to the difference in index of refraction between polymer and aqueous phase than to the presence of opaque polymer particles having diameters in the vicinity of the upper colloidal range. The polymer dispersions made by procedures of the above-exemplified type thicken to some extent on standing and are readily agglomerated by addition of acid.

Other procedures are known for preparation of copolymers containing hydrophilic substituents, some of which may be adapted to the purpose of the present invention. However, it should be kept in mind that the dispersed polymer derives its most desirable physical properties from the fact that it is very poorly solvated by water and is therefore capable of forming water-resistant films and coatings. Such a dispersed polymer is very easily agglomerated. To obtain even fairly stable dispersions it is necessary that the hydrophilic groups be uniformly distributed throughout all the polymer molecules. Nonuniformity will cause variation in the degree of solvation of molecules and increases the tendency toward agglomeration. A nonuniform product requires such a high proportion of hydrophilic substituents to keep it dispersed that it makes coatings with poor water resistance. On the other hand, a nonuniform polymer without an excessive proportion of hydrophilic groups may not disperse satisfactorily, since the presence of less-solvated molecules is likely to initiate gelation.

Various modifications may be made in the procedure for hydrolysis and dispersion of the uniform copolymer, employing auxiliary solvents, high shearing forces or other means to promote rapid dispersion of the polymer.

THE ALKYLAMINE-ETHYLENE OXIDE CONDENSATION PRODUCT

The ethoxylated alkylamine is preferably selected so that it is completely water-soluble at the temperature at which it is desired to add it to the polymer dispersion. A preferred product is obtained by the condensation of about 15 moles of ethylene oxide with a primary alkylamine in which the alkyl group contains an average of about 18 carbon atoms. A product of this type which is water-soluble at room temperature is made from an amine in which the alkyl group is derived from tallow fatty acid and is available under the trade name Ethomeen T/25. This ethoxylated amine was selected for use in the following illustrative examples. With regard to low molecular weight ethoxylated alkylamines, it has been found that a condensation product of 5 moles of ethylene oxide with an alkylamine derived from coconut oil fatty acids will give a stable dispersion at elevated temperatures but causes solubility problems at or near room temperature (about 25° C.). The product of condensation of 50 moles of ethylene oxide with an octadecylamine, having an average molecular weight of about 2500, gave satisfactory, stable dispersions at room temperature.

In a preferred embodiment of the present invention, a uniform copolymer of ethylene with about 20 percent by weight methyl acrylate is reacted with aqueous sodium hydroxide and ammonia to convert about 50 percent of the ester groups to the sodium salt, about 30 percent to the amide and about 17 percent to the free acid, leaving about 3 percent of the ester groups unchanged. The resulting polymer, in which about 4 to 5 percent of the carbon atoms of the polymer chain have hydrophilic groups attached thereto, is combined with about 39 percent by weight of total solids of a water soluble polyoxyethylene alkylamine having alkyl groups containing 16 to 20 carbon atoms and a molecular weight of about 925. The highly stable dispersion obtained is useful in a great variety of applications.

The invention is illustrated specifically in the examples which follow. All viscosity values given are Brookfield viscosity.

Example I

A uniform copolymer of ethylene containing approximately 20 percent by weight methyl acrylate was converted to an aqueous dispersion by the procedure given above. The aqueous dispersion contained 23.2 percent polymer solids and possessed a viscosity of 2520 cps. To 37.25 lb. of this dispersion was then added, with stirring, 10 lb. of water, 5.53 lb. of Ethomeen TD–25 (a distilled product of condensation of about 15 moles of ethylene oxide with alkylamine in which the alkyl group is derived from tallow fatty acids), and 1.0 lb. of citric acid dissolved in 1.32 lb. of water, to reduct the pH to near neutrality (6.0). The resulting polymer dispersion contained 27.6 percent solids, had a viscosity of 9.6 cps. and was very stable in storage. The dispersion was used to impregnate a non-woven web at a level of about 30 percent polymer solids. After curing by heating to remove water and coalesce polymer particles, the non-woven fabric was firmly bound together and possessed a pleasing, soft "hand."

Example II

A uniform copolymer of ethylene containing approximately 20 percent methyl acrylate was converted to an aqueous dispersion by reacting with ammonia, water and sodium hydroxide according to the procedure given above. The white, translucent aqueous dispersion contained 23.2 percent solids and had a viscosity of 2520 cps. Of the original ester groups in the uniform copolymer, 3.1 percent remained unchanged, 12.6 percent were in the form of free acid, 27.9 percent were converted to amide and 51.6 percent were in the form of the sodium salt.

To 39.50 lbs. of the aqueous polymer dispersion was added 5.60 lb. of Ethomeen TD–25, 1.83 lb. of 85 percent phosphoric acid. The resulting dispersion was white, translucent, had a total solids content of 34.4 percent, a Brookfield viscosity of 17.5 cps. and a pH of 6.1. This product was very stable in storage, showing no tendency to gel over an extended period of time.

Example III

A uniform copolymer of ethylene containing about 20 weight percent methyl acrylate (175 g.), sodium hydroxide (2.5 g.), 28 percent aqueous ammonia (87 ml.), Ethomeen T–25 (112 ml.) and 1200 ml. of distilled water were reacted with stirring for six hours at 250° C. The product was an acid-stable polymer dispersion having a Brookfield viscosity of 64.7 cps. Analyses indicated that 15.8 percent of the ester groups in the original polymer were converted to the sodium salt, 21.6 percent to the amide, 37.6 percent to the carboxylic acid and 25 percent of the ester groups remained unchanged.

Normally, conversion of only 15.8 percent of the ester groups to the sodium salt is insufficient to yield an aqueous dispersion of the polymer. However, the presence of the ethoxylated alkylamine makes possible the formation of stable aqueous dispersions in which from 5 percent to 100 percent of the ester groups are converted to the sodium salt. Without the ethoxylated alkylamine, stable dispersions are formed only upon the conversion of about 35 percent to 60 percent of the ester groups to the sodium salt. Because of this beneficial effect, it is preferred to form the polymer dispersion in the presence of the ethoxylated alkylamine.

*Example IV*

To 100 parts by weight of the unstabilized aqueous polymer dispersion of 23.2 percent solids content and 2520 cps. viscosity employed in Example II was added 15 parts by weight of a product obtained by condensing approximately 15 moles of ethylene oxide per mole of alkylamine in which the alkyl groups were derived from coconut oil fatty acids. After thorough mixing the pH of the resulting dispersion was adjusted to 6.0 by addition of acetic acid. The product was a stable dispersion with a total solids content of 32.8 percent and a viscosity of 27 cps. The dispersion was used to bond a non-woven web, yielding a bonded web with a soft hand.

*Example V*

The experiment of Example IV was repeated with the exception that the ethoxylated alkylamine employed was a product of condensation of about 15 moles of ethylene oxide with an alkylamine in which the alkyl groups were derived from soybean oil fatty acids. The resulting stable polymer dispersion contained 33.6 percent total solids and had a Brookfield viscosity of 155 cps. A non-woven web bonded with this polymer possessed a hand of characteristics intermediate between soft and harsh.

*Example VI*

The experiment of Example IV was repeated with the exception that to 100 parts by weight of the unstabilized polymer dispersion was added 40 parts by weight of an ethoxylated alkylamine which was obtained by condensing about 50 moles of ethylene oxide with an octadecylamine in which the octadecyl groups were derived from a commercial stearic acid. The ethoxylated alkylamine, which had an average molecular weight of about 2470, was dissolved in about 30 parts of water prior to addition to the polymer dispersion to facilitate handling. The product was a stable polymer dispersion of 26.4 percent total solids and a viscosity of 11 cps. A non-woven web bonded with this polymer dispersion exhibited an exceptionally soft hand.

The dispersions of the present invention are exceptionally stable to a variety of treatments and storage conditions, and may be prepared in highly concentrated form without gelling. By way of illustration, the aqueous dispersion produced in Example I was heated and water was distilled off to yield a total solids content of 46.6 percent. The viscosity rose to 1436 cps., but the dispersion remainded stable and did not gel.

The polymer dispersions of the present invention are also remarkably stable to alternate freezing and thawing, whether the ethoxylated alkylamine is added to the composition before or after the polymer is dispersed. A uniform copolymer of ethylene with about twenty percent by weight methyl acrylate was converted to stable dispersions containing various proportions of Ethomeen T-25, added either before or after the polymer was dispersed. (Ethomeen T-25 is a product of condensation of about 15 moles of ethylene oxide with a fatty amine derived from tallow fatty acids.) The resulting stable dispersions were subjected to five freeze-thaw cycles in which the samples were kept at minus 16° C. for 48 hours, then at room temperature for 24 hours and viscosity determined at this time. Results are tabulated below:

FREEZE-THAW STUDIES

| Percent Ethomeen TD-25 in Sample | Addition Mode | Percent Total Solids | Brookfield Viscosity (cps.) | | | | | |
|---|---|---|---|---|---|---|---|---|
| | | | Initial | Cycle | | | | |
| | | | | 1 | 2 | 3 | 4 | 5 |
| 36 | After dispersion of polymer. | 27.6 | 10.4 | 11.0 | 9.5 | 11.2 | 11.9 | 12.6 |
| 36 | ----do---- | 32.4 | 14.7 | 18.4 | 16.5 | 15.7 | 17.2 | 18.7 |
| 36 | ----do---- | 38.0 | 31.0 | 33.2 | 33.4 | 37.3 | 45.5 |
| 36 | ----do---- | 34.0 | 23.8 | 20.8 | 18.6 | 22.2 | 23.6 | 22.5 |
| 50 | Before dispersion of polymer. | 26.4 | 46.8 | 39.0 | 41.5 | 46.4 | 47.1 | 50.0 |
| 39 | ----do---- | 25.0 | 64.7 | 76.4 | 72.4 | 75.6 | 82.2 | 87.4 |
| 39 | ----do---- | 25.0 | 41.2 | 45.5 | 40.5 | 44.2 | 45.1 | 48.3 |

The dispersions of the present invention are relatively insensitive to acids. It is quite feasible to add one or more of a number of different acids in order to adjust the pH to the desired figure. With phosphoric acid, for example, the pH may be adjusted over the range of about 4 to 10 without deleterious effects. Other acids which are useful for neutralization of the polymer dispersions are acetic, citric, tartaric and gluconic. Because of the lack of sensitivity to acids, the dispersions of the present invention may be combined with a variety of cross-linking and curing agents. The combination of the stable aqueous polymer dispersion with a curing or cross-linking agent is particularly useful in bonding non-woven webs and in coating the backs of tufted carpets and upholstery fabrics. Examples of suitable curing agents are bis hydroxymethyl ethyleneurea, hydroxymethyl melamines and combinations of triazones with dialkyl sulfates.

Study of the illustrative examples reveals that the desired stable dispersions contain approximately one ethoxylated alkylamine molecule for every four hydrophilic substituents on the polymer. It has been determined experimentally that variations in either direction from this ratio are accompanied by loss of the desirable properties imparted by the ethoxylated alkylamine. This behavior indicates that some sort of inter-molecular association occurs, but an explanation of the nature of this phenomenon is not presently available. The loss of stability which occurs on variation of the ratio of the two substances fortunately is not an abrupt change, so that minor variations within the range of error common in normal manufacturing procedures may be tolerated.

What is claimed is:

1. A stable aqueous dispersion of a composition consisting essentially of a substantially uniform copolymer having a hydrocarbon chain structure, from about 2.5 percent to about 25 percent of the carbon atoms in said chain having attached thereto substituents selected from the group consisting of carbalkoxy, carboxy, carboxylate salt, carbamyl and N-substituted carbamyl, from about 15 to 100 percent of said substituents being in carboxylate salt form, and approximately one-fourth of a molar equivalent quantity, based on the total number of said substituents of a product of condensation of a primary alkylamine with from about 5 to 50 moles of ethylene oxide, said condensation product having an average molecular weight within the range of about 420 to about 2500.

2. A stable aqueous dispersion of a composition consisting essentially of a substantially uniform copolymer having a hydrocarbon chain structure, from about 4 to 7 percent of the carbon atoms in said chain having attached thereto substituents selected from the group consisting of Carbalkoxy, carboxy, carboxylate salt, carbamyl and N-substituted carbamyl, from about 15 to 100 percent of said substituents being in carboxylate salt form, and approximately one-fourth of a molar equivalent quantity, based on the total number of said substituents, of a product of condensation of a primary alkylamine in which the alkyl group contains from about 12 to about 20 carbon atoms with a total of about 10 to 20 moles of ethylene oxide.

3. A stable aqueous dispersion of a composition consisting essentially of a substantially uniform copolymer having a hydrocarbon chain structure, from about 4 to 5 percent of the carbon atoms in said chain having attached thereto hydrophilic substituent groups, about 50 percent of which are sodium carboxylate, about 30 percent are carbamyl, about 17 percent are carboxy and about 3 percent are carbalkoxy, and approximately one-fourth of a molar equivalent quantity, based on the total number of said hydrophilic substituents of a water-soluble product of condensation of ethylene oxide with a primary alkylamine in which the alkyl group contains from about 16 to about 20 carbon atoms, said condensation product having a molecular weight of about 925.

4. The method of making a water-resistant bonded web having a soft hand, comprising the steps of applying the aqueous dispersion of claim 1 to a fibrous web so that said dispersion penetrates interstices between fibers and subsequently removing water and coalescing the polymer particles.

5. The reaction of a uniform ethylene-alkyl acrylate copolymer with an alkali metal hydroxide, aqueous ammonia and an ethoxylated alkylamine to yield a stable aqueous dispersion as claimed in claim 1.

6. The stable aqueous dispersion of claim 1 wherein said copolymer consists of an ethylene copolymer.

7. The stable aqueous dispersion of claim 2 wherein said copolymer consists of an ethylene copolymer.

References Cited

UNITED STATES PATENTS

| 2,807,865 | 10/1957 | Shippee et al. | 260—29.6 |
| 3,245,934 | 4/1966 | Krzyszkowski | 260—29.6 |
| 3,249,570 | 5/1966 | Potts et al. | 260—29.6 |
| 3,265,654 | 8/1966 | Glabisch et al. | 260—29.6 |

FOREIGN PATENTS

| 1,281,103 | 11/1961 | France. |
| 813,814 | 5/1959 | Great Britain. |

OTHER REFERENCES

Armour Etho-Chemicals, Armour Chemical Division Bulletin, 955, p. 20.

MURRAY TILLMAN, *Primary Examiner.*

GEORGE F. LESMES, *Examiner.*

W. J. BRIGGS, Sr., *Assistant Examiner.*